March 28, 1950  S. L. MOORE  2,502,167
CONTROL SYSTEM FOR ELECTRICAL MOTORS
Filed Oct. 30, 1948

Inventor:
Samuel L. Moore,
by *Crowell F. Mack*
His Attorney.

Patented Mar. 28, 1950

2,502,167

UNITED STATES PATENT OFFICE 2,502,167

CONTROL SYSTEM FOR ELECTRICAL MOTORS

Samuel L. Moore, Fort Wayne, Ind., assignor to General Electric Company, a corporation of New York Application October 30, 1948, Serial No. 57,571

9 Claims. (Cl. 318—267)

This invention relates to reversal control systems for electric motors and particularly to such systems for motors having split field windings.

Electric motors of the reversible type are utilized for many purposes, particularly for drives having mechanical limits of travel such as doors; wing flaps, and landing gear for airplanes. Such motors are generally of the split field type wherein one field winding part is utilized for exciting the motor in one direction of rotation and the other for excitation in the opposite direction. The control of these motors has generally been complicated since provision must be made for removing the excitation from the motor when the mechanical limit of the load has been reached, for pre-selecting the other field winding part so that the motor can be operated in the opposite direction when desired, and furthermore, for assuring that the motor armature is not energized when the field is deenergized.

It is an object of this invention to provide an improved and simplified reversible motor drive system.

Another object of this invention is to provide an improved reversal control system for electric motors having split fields.

Further objects and advantages of this invention will become apparent and the invention will be better understood from the following description referring to the accompanying drawing, and the features of novelty which characterize this invention will be pointed out with particularity in the claims annexed to and forming a part of this specification.

One important feature of this invention is the provision of interlocks for preselecting the proper field part responsive to a predetermined load condition, and means for opening and closing the motor armature circuit responsive to excitation of the individual field winding parts of the motor. A double throw switch is utilized to select the appropriate field part for the direction of rotation desired and the opening and closing means insure that the armature is energized only when the field is excited.

Figure 1:
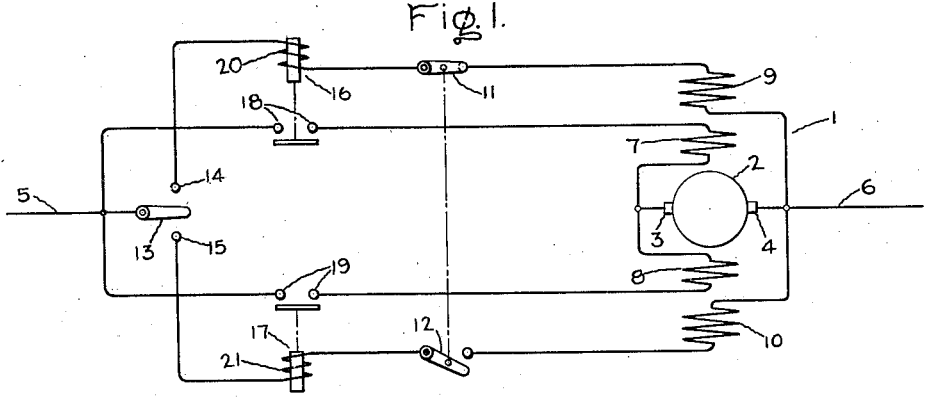
Figure 2:
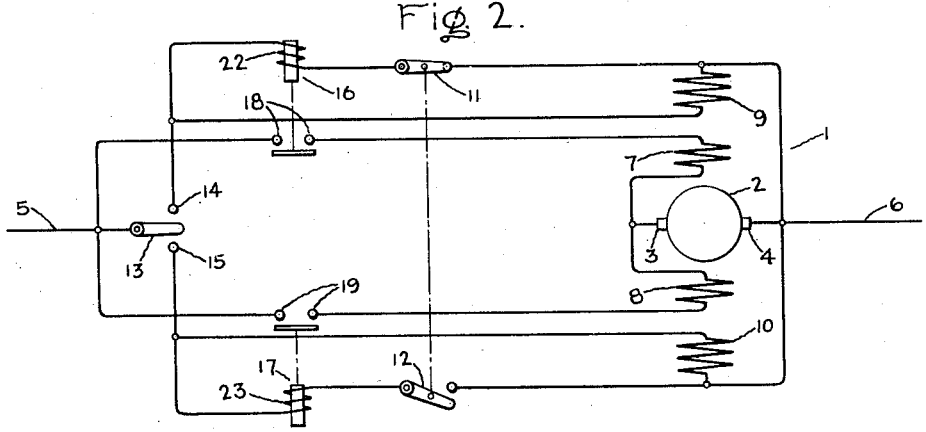
Figure 3:
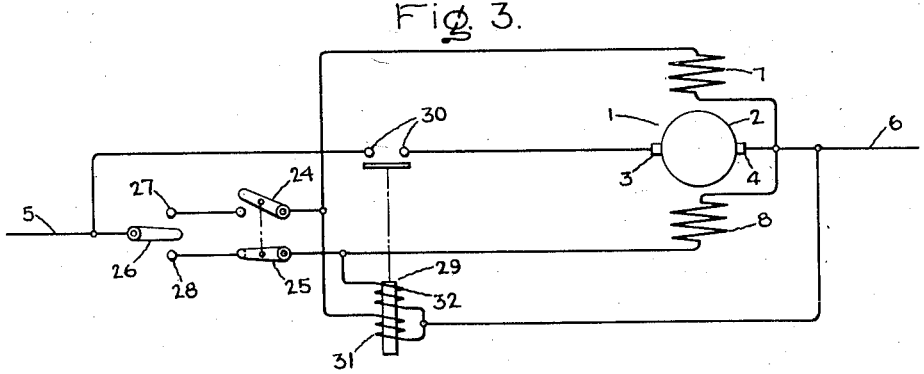

In the drawing, Fig. 1 is a schematic illustration of a reversal control system for an electric motor provided with an embodiment of this invention, and Figs. 2 and 3 are schematic illustrations showing further embodiments of this invention.

Referring now to Fig. 1, there is shown a reversible motor system in which the motor 1 is adapted to operate in either direction of rotation to drive an external mechanical load (not shown).

This motor is provided with an armature 2, which may be of any conventional type, to which energization is provided through brushes 3 and 4 which are adapted to be connected to a source of electric power through conductors 5 and 6. Excitation is provided to the motor by a split two-part series field exciting winding 7 and 8, and a split two-part shunt field exciting winding 9 and 10. Thus, when the motor is excited by field winding parts 7 and 9, it will operate in one direction of rotation, and when excited by field winding parts 8 and 10, it will operate in the opposite direction of rotation.

If the driven load of this system is a door or other device having definite mechanical limits of travel, it is necessary to remove the excitation from the motor and to provide for reversing the motor to operate the device in the opposite direction. Thus, when a predetermined load condition is reached, the energization of that part of the field windings which excited the motor for driving the load in that direction must be removed and the circuit for the energization of the other part of the field windings closed to provide for the opposite direction of rotation when desired.

This selective opening and closing of the circuit of each part of the field winding in response to different predetermined conditions of load may be provided by mechanically connected interlocks 11 and 12 connected in series with the shunt field winding parts 9 and 10 respectively. These interlocks preselect the appropriate shunt field parts for the required direction of rotation for any predetermined load condition. In order to selectively energize the particular shunt field part preselected by the interlocks 11 and 12, a double throw switch 13 having contacts 14 and 15 is provided.

It is necessary that the motor armature 2 be energized through the series field winding part corresponding to the shunt field winding part selected. It is also necessary to insure that excitation is not applied to the motor armature when the shunt field is de-energized. To secure these features, relays 16 and 17 having contacts 18 and 19 respectively arranged in series with series fielding winding parts 7 and 8 are provided. These relays are actuated respectively by operating coils 20 and 21 in series with shunt field winding parts 9 and 10.

In operation, starting at rest, one or the other of the interlock contacts 11 or 12 will be closed in response to the particular predetermined load condition therefor, providing for rotation of the motor in the corresponding direction. Assuming interlock 11 to be closed, as shown in Fig. 1, closing double throw switch 13 to position 14 completes the circuit of shunt field winding part 9 and energizes operating coil 20 of relay 16. This in turn closes contacts 18 exciting the motor armature 2 through series field winding part 7 causing the motor armature to rotate in the corresponding direction. When the mechanical limit of travel of the driven load is reached, interlock contact 11 will open thus opening the circuit of shunt field winding part 9 and deenergizing relay operating coil 20. Removing the energization from coil 20 opens relay contacts 18 which in turn opens the circuit of series winding part 7 stopping the motor.

Simultaneously with the opening of interlock contact 11, interlock contact 12 will close thus setting up the system for operation of the motor in the opposite direction of rotation. When it is desired to operate the motor in this energized condition, double throw switch 13 is moved to position 15 energizing shunt field winding part 10 and relay operating coil 21 causing contacts 19 of relay 17 to close thus energizing the motor armature 2 through series field winding part 8.

It will be readily apparent that whenever the circuit of either of the shunt field windings of the motor is opened, de-energization of the particular relay operating coil in use at the time will immediately result. This will open the circuit of the corresponding series field winding part thus stopping the motor. In this way, energization of the motor armature when the shunt field winding is opened is effectively prevented.

In the event that the motor is not utilized with a load having definite mechanical limits of travel, and the motor is merely utilized as a conventional reversible drive, interlocks 11 and 12 may be omitted and relays 16 and 17 in connection with double throw switch 13 provide a simple reversing system. An additional feature of this system is the fact that the reversing switch 13 is not required to carry the motor armature current and need, therefore, only be designed to carry the current required in one shunt field winding part.

Referring now to Fig. 2, in which like parts are indicated by like reference numerals, there is shown another embodiment of this invention similar to that shown in Fig. 1, however, with the relay operating coils connected in parallel with the shunt field winding parts. Here, motor 1 is provided with armature 2, and is excited through brushes 3 and 4 from line 5 and 6. The motor is excited for either direction of rotation by split two-part series field winding 7 and 8 and split two-part shunt field winding 9 and 10. Double throw switch 13 having contacts 14 and 15 is provided to selectively energize the appropriate shunt field winding part for the direction of rotation preselected by the interlocks 11 and 12.

In this embodiment, relays 16 and 17, whose contacts 18 and 19 are respectively connected in series with the series field winding parts 7 and 8, are provided with operating coils 22 and 23 respectively connected in parallel with the shunt field winding parts 9 and 10. Interlocks 11 and 12 are connected in series with relay operating coils 22 and 23 and are used to preselect the particular series field winding part for the direction of rotation required responsive to different pre-determined conditions of the driven load.

In operation, assuming that interlock 11 has been closed by a particular predetermined load condition, moving double throw switch 13 to position 14 energizes shunt field winding part 9 and relay operating coil 22 through interlock 11. This in turn causes contacts 18 to close energizing motor armature 2 through series field part 7. When the mechanical limit of travel of the load is reached, interlock 11 will be opened and interlock 12 simultaneously closed setting up the system for rotation of the motor in the opposite direction. When interlock 11 is opened relay operating coil 22 is de-energized causing contacts 18 to open removing the excitation from motor armature 2 and series field winding part 7 and thus stopping the motor. When it is desired to operate the load in the opposite direction, double throw switch 13 is moved to position 15 energizing shunt field part 10 and relay operating coil 23 through interlock 12. This closes contacts 19 energizing motor armature 2 through series field winding part 8. It will be apparent that the embodiment of this invention shown in Fig. 2 effectively assures that the motor armature will not be energized unless one of the individual shunt field parts is connected in the circuit. As in Fig. 1, interlocks 11 and 12 can be conveniently omitted to provide a simplified reversal control system where mechanical limits of the driven load are not involved.

Referring now to Fig. 3, in which like parts are also indicated by like reference numerals, there is shown a further embodiment of this invention in which one relay having two operating coils is provided. Here, motor 1 is provided with armature 2 and is excited through brushes 3 and 4 from line 5 and 6. The motor is excited in either direction of rotation by split two-part shunt field winding 7 and 8. Interlocks 24 and 25 are used to preselect the particular shunt field winding part for the direction of rotation required in response to different predetermined conditions of load. Double throw switch having contacts 27 and 28 is provided to selectively energize the appropriate shunt field winding part for the direction of rotation selected by interlocks 24 and 25. Relay 29 has contacts 30 connected in series in the motor armature circuit between line 5 and brush 3. This relay is provided with two operating coils 31 and 32 respectively connected in parallel with shunt field winding parts 7 and 8.

Assuming that interlock 25 has been closed responsive to a predetermined condition of the driven load, closing switch 26 to position 28 energized shunt field winding part 8 and relay operating coil 32 causing contacts 30 to close applying excitation to the motor armature circuit. When interlock 25 is caused to open by the driven load, interlock 24 is simultaneously closed thus setting up the system for operation in the opposite direction of rotation. Closing switch 26 to position 27 therefore energizes shunt field winding part 7 and relay operating coil 31 which in turn closes contacts 30 providing excitation to armature 2. It will be seen that this arrangement provides for the energization of the motor armature only when one of the shunt field winding parts has been energized. It will also be seen that interlocks 24 and 25 can be omitted if a conventional reversal control system is desired.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of my invention.

What I claim as new and desire to secure by Letters Patent of the United States is:

1. In combination, an electric motor having an armature and a plurality of field exciting windings, said windings including a split two-part series winding and a split two-part shunt winding for exciting said motor in either direction, means including a double throw switch for selectively energizing either of said shunt field winding parts, and means for opening and closing the circuit of either of said series field winding parts, said means including two operating coils respectively in circuit with said shunt field winding parts whereby either of said series field winding parts is opened or closed in response to excitation of the associated shunt field winding part.

2. A reversal control system for an electric motor adapted for connection to a mechanical load and having an armature and a plurality of field exciting windings, said windings including a split two-part series winding and a split two-part shunt winding for exciting said motor in either direction, comprising means for selectively opening and closing the circuit of each of said shunt field winding parts in response to different predetermined conditions of said load, means including a double throw switch for selectively energizing either of said shunt field winding parts through said selective circuit closing means, and relay means for opening and closing the circuits of either of said series field winding parts and including two operating coils respectively in circuit with each of said shunt field winding parts whereby either of said series field winding parts is opened and closed responsive to excitation of the associated shunt field winding part.

3. In combination, an electric motor having an armature and a plurality of field exciting windings, said windings including a split two-part series winding and a split two-part shunt winding for exciting said motor in either direction, means for selectively energizing either of said shunt field winding parts, and means for opening and closing the circuit of either of said series field winding parts, said means including two operating coils respectively in series with said shunt field winding parts whereby either of said series field winding part circuits is opened and closed responsive respectively to opening of the circuit of the associated shunt field winding part an energization of said associated shunt field winding part.

4. In combination, an electric motor having an armature and a plurality of field exciting windings, said windings including a split two-part series winding and split two-part shunt winding for exciting said motor in either direction, means including a double throw switch for selectively energizing either of said shunt field winding parts, and two relays having contacts respectively in series with each of said series field winding parts for opening and closing the circuits of said series field winding parts, said relays having operating coils respectively in series with each of said shunt field winding parts whereby either of said series field winding circuits is opened and closed in response respectively to opening the associated shunt field winding part and excitation of said associated shunt field winding part.

5. A reversal control system for an electric motor adapted for connection to a mechanical load and having an armature and a plurality of field windings, said windings including a split two-part series winding and a split two-part shunt winding for exciting said motor in either direction, comprising means for selectively opening and closing the circuit of each of said shunt field winding parts in response to different predetermined conditions of said load, means including a double throw switch for selectively energizing either of said shunt field winding parts through said selective circuit closing means, and two relays respectively in series with each of said series field winding parts, said relays having operating coils respectively in series with each of said shunt field winding parts whereby either of the series field winding part circuits is opened and closed in response respectively to opening the associated shunt field winding part and excitation of said associated shunt field winding part.

6. In combination, a motor having an armature and a plurality of field exciting windings, said windings including a split two-part series winding and a split two-part shunt winding for exciting said motor in either direction, means for selectively energizing either of said shunt field winding parts, and means for opening and closing the circuit of either of said series field winding parts, said means including two operating coils respectively in parallel with said shunt field winding parts whereby either of said series field winding part circuits is opened and closed respectively to excitation of the associated shunt field winding part.

7. A reversal control system for an electric motor having an armature and a plurality of field exciting windings, said windings including a split two-part series winding and a split two-part shunt winding for exciting said motor in either direction comprising means including a double throw switch for selectively energizing either of said shunt field winding parts, and two relays having contacts respectively in series with each of said series field winding parts for opening and closing the circuits of said series field winding parts, said relays having operating coils respectively in parallel with each of said shunt field winding parts whereby either of said series field winding circuits is opened and closed in response to excitation of the associated shunt field winding part.

8. A reversal control system for an electric motor adapted for connection to a mechanical load and having an armature and a plurality of field exciting windings, said windings including a split two-part series winding and a split two-part shunt winding for exciting said motor in either direction, comprising means including a double throw switch for selectively energizing either of said shunt field winding parts, two relays having contacts respectively in series with each of said series field winding parts for opening and closing the circuits of said series field winding parts, said relays having operating coils respectively in parallel with each of said shunt field winding parts whereby either of said series field windings circuits is opened and closed in response to excitation of the associated shunt field winding part, and means for selectively opening and closing the circuits of said relay coils in response to different predetermined conditions of said load.

9. In combination, an electric motor having an armature and a split two-part shunt field exciting winding for exciting said motor in either direction, means for selectively energizing either of said shunt field winding parts, and means for opening and closing said armature circuit having two coils respectively in parallel with said shunt field winding parts whereby said motor armature circuit is opened and closed responsive to excitation of said shunt field winding parts.

SAMUEL L. MOORE.

REFERENCES CITED

The following references are of record in the file of this patent:

UNITED STATES PATENTS

| Number | Name | Date |
|---|---|---|
| 2,406,196 | Chilman | Aug. 20, 1946 |
| 2,435,440 | Graham | Feb. 3, 1948 |